Patented Mar. 27, 1951

2,546,898

UNITED STATES PATENT OFFICE 2,546,898

DEODORIZING METHOD

Walter Vande Mark, Plymouth, Mich.

No Drawing. Application November 5, 1947,
Serial No. 784,305

3 Claims. (Cl. 167—22)

The present invention relates to deodorants and more particularly to deodorants for both human and industrial use.

The primary objects of the invention are to provide a liquid deodorant which effectively suppresses all classes of offensive odors without substituting for such odors the odor of the deodorant itself; to provide a liquid deodorant which is chemically stable and which undergoes no deterioration over prolonged periods of time; to provide a deodorant which is non-staining; to provide a deodorant which is relatively non-volatile, non-explosive and non-inflammable; to provide a deodorant which is non-injurious to fabrics, rubber goods and other materials with which it is likely to come into contact; to provide a deodorant having a strong antiseptic character; to provide a deodorant which is non-poisonous and non-irritating to the skin; and to provide a deodorant which is simple and economical to manufacture.

The invention accordingly comprises the ingredients and combinations of ingredients, the proportions thereof, and features of composition, as exemplified in the products hereinafter described, and the scope of the application of which will be indicated in the claims which follow.

A characteristic of most deodorants is that they substitute the presumably pleasant odor of the deodorant for the offensive odor, thus masking the offensive odor without actually counteracting it. The disadvantage of such deodorants is that, as they "wear off" or evaporate, their own odor becomes offensive in most cases, and this offensive odor coupled with the original offensive odor, which still remains, creates a condition worse than at the outset. In contrast to this, the deodorant of the present invention actually destroys the odor of things to which it is applied.

The present invention utilizes the discovery that an aqueous solution of sulphonated castor oil has a remarkable deodorizing property. Another discovery utilized in the invention is that the final solution will not separate with the oil floating on the water, if the water is added to the oil slowly while stirring during the mixing of the solution. Further it has been found that the stability of the solution is improved if distilled water is used as the solvent medium.

The solution is preferably compounded as follows, it being understood that the proportions of the ingredients are subject to modification: 8 gallons of sulphonated castor oil are diluted with 100 gallons of water, the water being added to the oil slowly while stirring. The resulting stock solution is further diluted at the time of use with 4 to 100 parts of water, depending upon the use and the strength of solution required. Upon test, the solution thus prepared has been found especially efficient in eliminating the following offensive odors:

1. Odor from garbage cans.
2. Odor from toilet bowls.
3. Odor from pets.
4. Odor from cess pools.
5. Odor from sewers.
6. Odor from soiled clothing and linen.
7. Kitchen odors.
8. Odor from urinals and public rest rooms.
9. Odor from baby diapers.

The following tests will demonstrate the deodorizing properties of the solution of the present invention.

1. Limburger cheese is rubbed on the hand. To this the solution is applied in a diluted form of 1 part stock solution to 5 parts water. The odor is immediately killed.

2. A piece of putrid meat is dipped into the solution in a diluted form of 1 part stock solution to 2 parts water. The meat immediately becomes odorless.

3. An ash tray having a strong tobacco odor is dipped in the solution in a diluted form of 1 part stock solution to 5 parts water and rinsed in tap water. The tray immediately becomes odorless.

The solution in any proportion of dilution is harmless to the skin and has no ill effects if taken internally. In addition to the effective deodorant properties, the solution of the present invention also has strong antiseptic properties.

It will be understood that the proportions of the sulphonated castor oil and water may be widely varied depending upon the use to which the solution is to be put, and that other changes might be made without departing from the spirit of the invention as the same is defined by the following claims.

I claim:

1. The method of deodorizing an odoriferous material which comprises treating said material with an aqueous solution of sulphonated castor oil.

2. The method of deodorizing odoriferous material comprising treating said material with a mixture of sulfonated castor oil and a quantity of water greater in volume than the volume of the sulfonated castor oil, said mixture being stable in that the separation of the oil and water components is inhibited.

3. The method of deodorizing odoriferous material comprising treating said material with a mixture consisting of 8 gallons of sulfonated castor oil and 100 gallons of water.

WALTER VANDE MARK.

REFERENCES CITED

The following references are of record in the file of this patent:

UNITED STATES PATENTS

| Number | Name | Date |
|---|---|---|
| 1,869,406 | Braunlich | Aug. 2, 1932 |
| 2,226,177 | Orelup | Dec. 24, 1940 |
| 2,236,970 | Goldfarb | Apr. 1, 1941 |

FOREIGN PATENTS

| Number | Country | Date |
|---|---|---|
| 694,062 | Germany | June 27, 1940 |

OTHER REFERENCES

Extra Pharmacopoeia, vol. 1, 1941, 22nd ed., page 909.

Bennett: Cosmetic Formulary (1937), pages 105, 106, 117.

Goodman: Cosmetic Dermatology (1936), page 182.

Glicher: Manufacturing Chemist, vol. 15, Aug. 1944, pages 276–278, 277.

Flett: Chemical Abstracts, vol. 41, page 1118.

U. S. Dispensatory, 24th ed. (1947), page 239.

Harry: Modern Cosmeticology (1940), page 256.